Dec. 5, 1944.  H. P. HAGGERTY  2,364,288
THREADLESS NUT AND BOLT
Filed Nov. 17, 1943
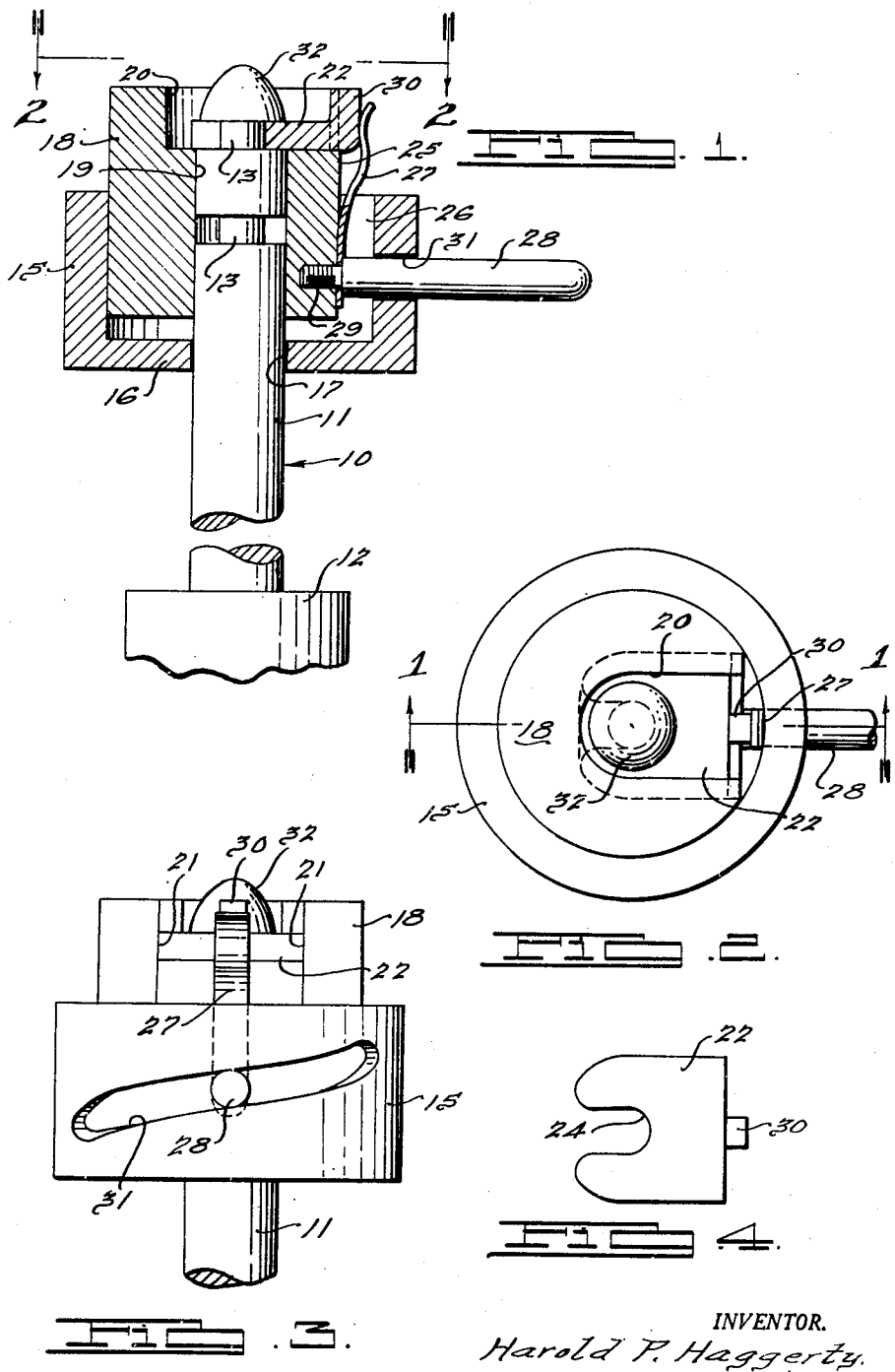
INVENTOR.
Harold P. Haggerty.
BY
Harness, Dickey & Pierce
ATTORNEYS.

Patented Dec. 5, 1944

2,364,288

UNITED STATES PATENT OFFICE 2,364,288

THREADLESS NUT AND BOLT

Harold P. Haggerty, Ferndale, Mich.

Application November 17, 1943, Serial No. 510,615

5 Claims. (Cl. 85—5)

The present invention relates to threadless nut and bolt constructions, and particularly to the type of fastening adapted for temporarily holding or clamping the members in position.

It is the general object of the present invention to provide an improved and simplified threadless nut and bolt construction which is adapted to clamp members of varying thickness and which requires a minimum of time and effort to secure in clamping position.

Another object of the invention is to provide a device of the character mentioned which may be applied or removed without the use of any tools.

Other objects and advantages of the invention will become apparent from the following specification, the drawing relating thereto, and from the appended claims.

In the drawing, in which like numerals are used to designate like parts in the several views throughout:

Figure 1 is a longitudinal section of the device of the present invention taken on the line 1—1 of Figure 2;

Figure 2 is a plan view taken on the line 2—2 of Figure 1;

Figure 3 is a side elevation of the device; and

Figure 4 is a plan view of the latching element incorporated in the device.

As best shown in Figure 1, the invention comprises a bolt, indicated generally at 10, having a shank 11 and a head 12, of any suitable or conventional construction except that the shank is not threaded. In place of threads, the shank is provided with any desired number of annular grooves 13 spaced along its length, which are adapted to be engaged by a latching device hereinafter more particularly described.

The nut comprises a generally cup-shaped housing member 15 having a bottom wall 16 adapted to bear against the member which is to be clamped and having an opening 17 through which the shank 11 of the bolt is adapted to pass freely. Seated within the cup-shaped housing 15 is a substantially cylindrical sleeve 18 having a central bore 19 through which the shank 11 of the bolt may pass freely.

The upper end of the member 18 is provided with a recess 20, of the form best shown in Figure 2, and the parallel straight side wall portions of the recess 20 are undercut to provide a pair of transversely extending grooves 21, best shown in Figure 3. A latching element 22, the form of which is best illustrated in Figures 1 and 4, is adapted to slide within the grooves 21 and to fit one of the grooves 13 in the shank 11 of the bolt, in the manner shown in Figure 1. The extremity of the latching member 22 is recessed at 24 to fit that portion of the bolt forming the bottom of the groove 13.

As best shown in Figures 1 and 2, the side of the cylindrical member 18 through which the latching member 22 projects is flattened off at 25 in order to provide a clearance space 26 between the cylindrical member 18 and the housing 15 at that point. A leaf spring 27 is positioned within the clearance space 26 and secured at its lower end to the cylindrical member 18 by means of a cylindrical handle member 28, which has a reduced threaded extremity 29 which passes through a corresponding opening in the lower end of the spring 27 and is threaded into a tapped opening in the member 18. The upper end of the leaf spring 27 engages an upstanding lug 30 on the latching member 22 and normally acts to force the latching member toward the shank of the bolt. The cylindrical handle member 28 projects outwardly through a helically arranged slot 31 formed in the housing 15, as best shown in Figure 3. The helix angle of the slot 31 is such that no amount of axial force exerted between the housing 15 and the handle 28 will cause relative rotation of the two about the axis of the bolt.

The end of the shank 11 of the bolt is provided with a rounded and tapered nose 32 of such contour that when the bolt is forced upwardly through housing 15 and member 18 it will engage the spring-pressed latch 22 and force it outwardly or to the right, as viewed in Figure 1, permitting the bolt to advance to the position illustrated, in which the spring forces the latch into the groove 13. As soon as the latch has entered a groove in the bolt, the handle 28 is swung in slot 31 relative to the housing 15 in order to develop the desired clamping action between the housing 15 and the bolt head 12.

It is apparent that any number of grooves 13 may be provided along the shank of the bolt in order to permit the nut assembly to be shifted to approximately its final position before the clamping rotation of the handle 28 and slot 31 is started. The space between the grooves 13 is preferably slightly less than the axial displacement of housing 15 when the handle 28 shifts from one end of the slot 31 to the other, so that the nut may be shifted to the next lower groove if the clamping movement of the handle 28, as limited by slot 31, is insufficient to produce sufficient clamping action.

When it is desired to release the nut, the handle 28 is swung to the left in groove 31, as viewed in Figure 3, to loosen the clamping pressure, whereupon the upper projection 30 on latch 22 may be engaged by the tip of the finger or fingernail and the latch withdrawn from the groove 13. The nut may then be lifted off the bolt.

While only one form of the mechanism is illustrated and described, it is apparent that changes may be made in the details of construction without departing from the spirit of the invention as set forth herein and within the scope of the appended claims.

What is claimed is:

1. A threadless nut and bolt assembly comprising a bolt having an annular groove formed in the shank thereof in spaced relation to the head of the bolt, and a nut mechanism comprising a cylindrical sleeve slidable on the shank of the bolt, a housing surrounding said sleeve, cam means for shifting said housing axially with respect to the sleeve on relative rotation between said sleeve and housing, and latch means carried by said sleeve and adapted to enter said groove to lock said sleeve in predetermined axial position on the shank of said bolt.

2. A threadless nut and bolt assembly comprising a bolt having an annular groove formed in the shank thereof in spaced relation to the head of the bolt, and a nut mechanism comprising a cylindrical sleeve slidable on the shank of the bolt, a housing surrounding said sleeve, cam means for shifting said housing axially with respect to the sleeve on relative rotation between said sleeve and housing, latch means carried by said sleeve and adapted to enter said groove, and resilient means normally urging said latch means into said groove to lock said sleeve in predetermined axial position on the shank of said bolt.

3. A threadless nut and bolt assembly comprising a bolt having an annular groove formed in the shank thereof in spaced relation to the head of the bolt, and a nut mechanism comprising a cylindrical sleeve slidable on the shank of the bolt, a housing surrounding said sleeve, said housing having a helical slot therethrough, means fixed to said sleeve and extending radially through said slot for exerting an axial clamping force between said sleeve and housing to effect axial shifting of said housing relative to said sleeve, and latch means carried by said sleeve and adapted to enter said groove to lock said sleeve in predetermined axial position on the shank of said bolt.

4. A threadless nut and bolt assembly comprising a bolt having an annular groove formed in the shank thereof in spaced relation to the head of the bolt, and a nut mechanism comprising a cylindrical sleeve slidable on the shank of the bolt, a housing surrounding said sleeve, said housing having a helical slot therethrough, means fixed to said sleeve and extending radially through said slot for exerting an axial clamping force between said sleeve and housing to effect axial shifting of said housing relative to said sleeve, latch means carried by said sleeve and adapted to enter said groove, and resilient means normally urging said latch means into said groove to lock said sleeve in predetermined axial position on the shank of said bolt.

5. A threadless nut and bolt assembly comprising a bolt having an annular groove formed in the shank thereof in spaced relation to the head of the bolt, and a nut mechanism comprising a cylindrical sleeve slidable on the shank of the bolt, a housing surrounding said sleeve, said housing having a helical slot therethrough, an arm extending radially through the helical slot and having a reduced threaded extension threaded into said sleeve, said arm and slot being adapted to effect axial shifting of said housing relative to said sleeve, a latch carried by said sleeve and movable radially into said groove, and a leaf spring having one end clamped between said arm and the sleeve and the opposite end bearing on the latch for urging it in the direction in which it enters said groove to lock said sleeve in predetermined axial position on the shank of said bolt.

HAROLD P. HAGGERTY.